Sept. 24, 1968 M. HOROWITZ ETAL 3,403,300

ELECTRONIC MODULE

Filed Sept. 1, 1966 3 Sheets-Sheet 1

INVENTORS
MAURICE HOROWITZ
JOHN T. LINK
BY JEFFERS & YOUNG
ATTORNEYS

ELECTRONIC MODULE

Filed Sept. 1, 1966 3 Sheets-Sheet 2

INVENTORS
MAURICE HOROWITZ
JOHN T. LINK
BY
JEFFERS & YOUNG
ATTORNEYS

INVENTORS
MAURICE HOROWITZ
JOHN T. LINK
BY JEFFERS & YOUNG
ATTORNEYS

United States Patent Office 3,403,300

Patented Sept. 24, 1968

3,403,300

ELECTRONIC MODULE

Maurice Horowitz, Fort Wayne, and John T. Link, New Haven, Ind., assignors to The Magnavox Company, Fort Wayne, Ind., a corporation of Delaware Filed Sept. 1, 1966, Ser. No. 576,675
8 Claims. (Cl. 317—101)

ABSTRACT OF THE DISCLOSURE

A module for receiving a flat pack with M terminals is formed with M layers, each of which has pads positioned to correspond with the flat pack terminals, and each of which has module terminals. One pad on each layer is connected to a selected module terminal. A flat pack is mounted on the module with each flat pack terminal connected to each of the correspondingly positioned pads of each layer so as to connect the flat pack terminals to respective, selected module terminals. A large number of interconnections between flat pack terminals and module terminals can thus be provided with a relatively small number of different layers.

Our invention relates to an improved electronic module, and particularly to a compact arrangement of such a module which is to be interconnected with a plurality of other such modules.

In the art of radio and electronics, systems and apparatus are becoming larger and more complex. As the art finds increasing uses and applications for such systems, the systems and apparatus are becoming larger and more complex, but the allowable space and weight of the systems and apparatus are being reduced. Such applications and conditions have resulted in the development of microelectronic apparatus. One example of microelectronic apparatus is the integrated circuit or flat pack which may contain a number of solid state devices and resistors, capacitors, and inductors all interconnected in some predetermined way. One integrated circuit or flat pack might provide, for example, several flip-flop circuits with accompanying amplifying stages. Such an integrated circuit or flat pack may measure 1/16 inch thick, 1/8 inch wide, and 1/4 inch long excluding the leads. Such integrated circuits or flat packs provide good utilization of space or packaging density. However, where a relatively large number of such flat packs are utilized, their interconnections become involved and tedious.

Accordingly, an object of our invention is to provide an improved module having an integrated circuit or flat pack mounted thereon for relatively easy connection to other similar modules.

Another object of our invention is to provide an improved module to which an integrated circuit or flat pack can be easily connected to the module terminals, these module terminals being constructed and arranged for easy and efficient connection to other modules.

While integrated circuits or flat packs provide good individual utilization of space or packaging density, previous physical arrangements and interconnections of a plurality of such integrated circuits or flat packs have not made or provided the best utilization of space. Previous physical arrangements have included mounting a plurality of flat packs on a printed circuit board or on sticks. Interconnections between such mounted flat packs have been somewhat arbitrary or random without too much consideration having been given to providing the least number of interconnections and to providing the shortest possible interconnections. In addition, if an attempt were made to utilize a calculator to optimize such packaging, the number of interconnecting systems would be so large due to the existing random packaging geometry that optimization would be laborious and impractical even with the use of a modern calculator. In other words, it is necessary that the integrated circuits or flat packs or other components be arranged in a highly orderly and systematic fashion and that their terminal arrangements for interconnections be likewise arranged. This is desirable or necessary so that the physical and electrical interconnection problems can be stated in suitable computer language thus allowing the use of modern computer techniques in determining the physical and electrical arrangements of the package necessary for optimum utilization of space or packing density.

Accordingly, another object of our invention is to provide a system of physical arrangement of mounting and interconnecting integrated circuits, flat packs, or other components, the system being amenable to computer analysis for optimizing the packaging and interconnection geometry for the best utilization of space or packaging density.

Another object of our invention is to provide an improved module on which an integrated circuit or flat pack can be easily mounted with its leads connected to predetermined locations on the module for interconnection to other modules or circuit elements.

Another object of our invention is to provide a module on which an integrated circuit or flat pack can be easily mounted and which can be arranged in compact and orderly fashion with other modules to be interconnected.

Another object of our invention is to provide a module for mounting an integrated circuit or flat pack thereon and connecting the integrated circuit or flat pack leads to module terminals so that the module with its associated and connected integrtaed circuit or flat pack permits close or dense packaging with other modules and so that the module terminals provide easy and efficient interconnections to the other modules.

Another object of our invention is to provide a module for an integrated circuit or flat pack, the module having terminals to which the flat pack leads are connected so that efficient or good interconnections with other modules can be determined to a large degree by computer techniques.

Printed circuit techniques are being used more and more for radio and electronic components, particularly where a circuit or system with a plurality of such components is to be mass produced. Such techniques provide connections from a component at one location on a printed circuit board or module to another component at another location on the board, or connections from a component on the board to a board terminal which is connected to other circuits. The electrical components, or integrated circuits or flat packs, are mounted on the printed circuit board or module, and connected to the printed circuit connections. While the printed circuit connections provide the desired electrical path or paths, and lend themselves to mass production techniques, any change in an electrical connection has required that the art work for the board or module be modified or changed to provide for such a connection change. Previous boards or modules may then become obsolete or have to be stored. Changes in the electrical connections from a component to a board or module terminal are frequently needed because of some change in another circuit, or because the board or module is to be used in a different system or with different circuits.

Accordingly, another object of our invention is to provide a printed circuit module comprised of a plurality of selected layers of individual printed circuit boards, these selected layers being stacked to provide the desired combination of connections between flat pack leads and module terminals.

Another object of our invention is to provide a printed circuit module comprised of a number of layers equal to the number of integrated circuit or flat pack leads for providing a relatively large number of possible combinations of connections between the flat pack leads and the module terminals from a relatively small number of such layers.

Another object of our invention is to provide a relatively few number of printed circuit layers which can be selectively combined to provide a relatively large number of combinations of modules, thereby eliminating the necessity for having the large number of modules and the attendant facilities and equipment for their manufacture.

Briefly, these and other objects are achieved in accordance with our invention by a small insulated board that is relatively thin and that has a main surface of a generally rectangular or square shape. The board has a plurality of electrical terminals along one or more edges. For example, test terminals may be provided at another edge. In one embodiment, a flat pack is mounted on the main surface of the board, and the flat pack leads are connected by wire leads to the board terminals to form a module in accordance with our invention. These connections are made in a predetermined manner so that each flat pack lead is connected to a specified and predetermined board terminal. A plurality of modules, each with its respective flat pack connected to specified or predetermined board terminals, are then mounted side by side with respectively located board terminals aligned for interconnection. These interconnections are easily and efficiently made by conductors extending along the edges of the boards or modules and connected to appropriate ones of the board or module terminals to provide a plurality of interconnected boards or modules which make good utilization of space or have a high packaging density. If the integrated circuit or flat pack is to be connected to the board or module terminals by a printed circuit, another embodiment of our invention provides a module which is built up from selected printed circuit layers. In accordance with this embodiment of our invention, each of these layers is provided with printed circuit flat pack pads for each of the flat pack leads, and with a plurality of printed circuit module or board terminals. In addition, each layer has a printed circuit which respectively connects one of the flat pack pads to one of the module or board terminals. The layers which connect the flat pack terminals to the desired module or board terminals are then stacked with the flat pack pads and board terminals aligned to form a module. In accordance with known printed circuit techniques, the corresponding and aligned flat pack pads and the corresponding and aligned board terminals may be connected together. Each of the flat pack pads is thus respectively connected by a printed circuit connection to a board terminal. The flat pack is mounted on the module and its leads are connected to the flat pack pads in any desired manner. Thus each flat pack lead is connected to a respective module or board terminal. If a flat pack has M leads and a module is to have N terminals, there are approximately M raised to the Nth power possible combinations of connections between the M flat pack leads and the N board terminals. In this and subsequent expressions, M and N may be any integers. However, the relatively large number of combinations can be obtained from only M times N different layers. A numerical example will illustrate this advantage in accordance with our invention. If a flat pack has five leads which may be required to be connected to any one of seven module or board terminals, there are approximately five raised to the seventh power or 78,125 possible combinations of connections. However, any one of this large number of combinations may be provided by any five selected layers from a total of five times seven or 35 different layers. Thus, only 35 different layer boards need to be stocked to provide the 78,125 possible combinations of printed circuit modules. Such a small number of layers results in a correspondingly small amount of printed circuit art work, labor, and facilities. As described in connection with the other embodiment, the assembled modules can be mounted side by side and interconnected by leads extending along the edges of the modules and connected to appropriate board or module terminals.

The subject matter which we regard as our invention is particularly pointed out and distinctly claimed in the claims. The structure and operation of our invention, together with further objects and advantages, may be better understood from the following description given in connection with the accompanying drawing, in which:

Figure 6:
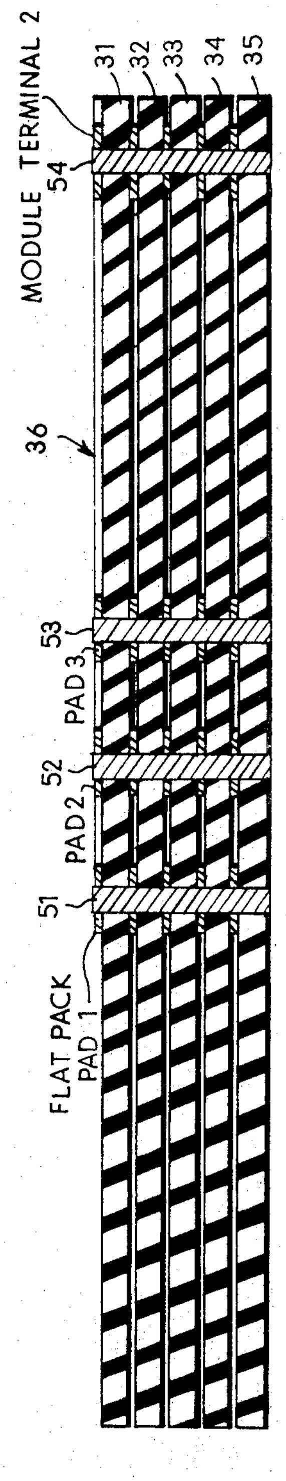
Figure 5:
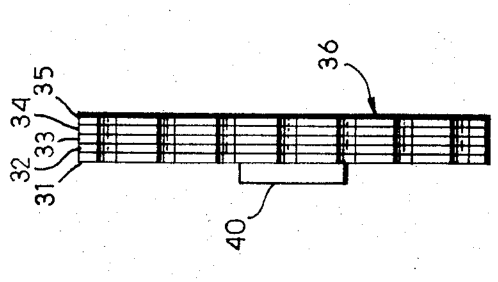
Figure 4:
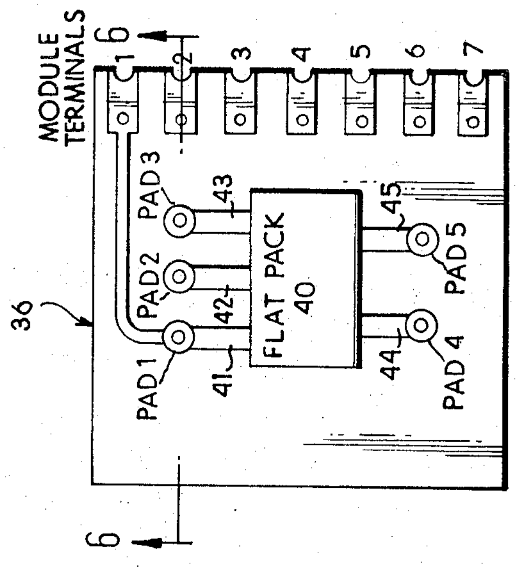

FIGURES 3*a* through 3*e* show plan views of a plurality of printed circuit layers for forming a module in accordance with a second embodiment of our invention;

FIGURES 4 and 5 show plan and side elevation views respectively of a module in accordance with our invention that is formed of the assembled layers shown in FIGURES 3*a* through 3*e*; and FIGURE 6 shows a cross sectional view taken along the lines 6—6 in FIGURE 4.

Figure 1:
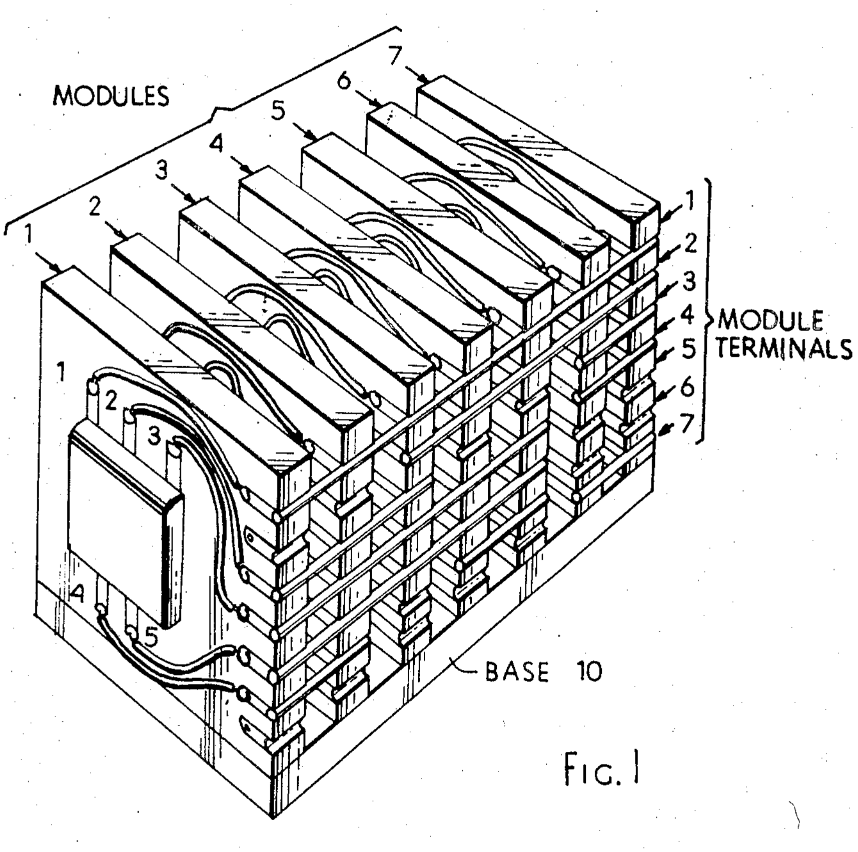
FIGURE 1 shows a perspective view of a plurality of modules constructed and assembled in accordance with one embodiment of our invention.
Figure 2:
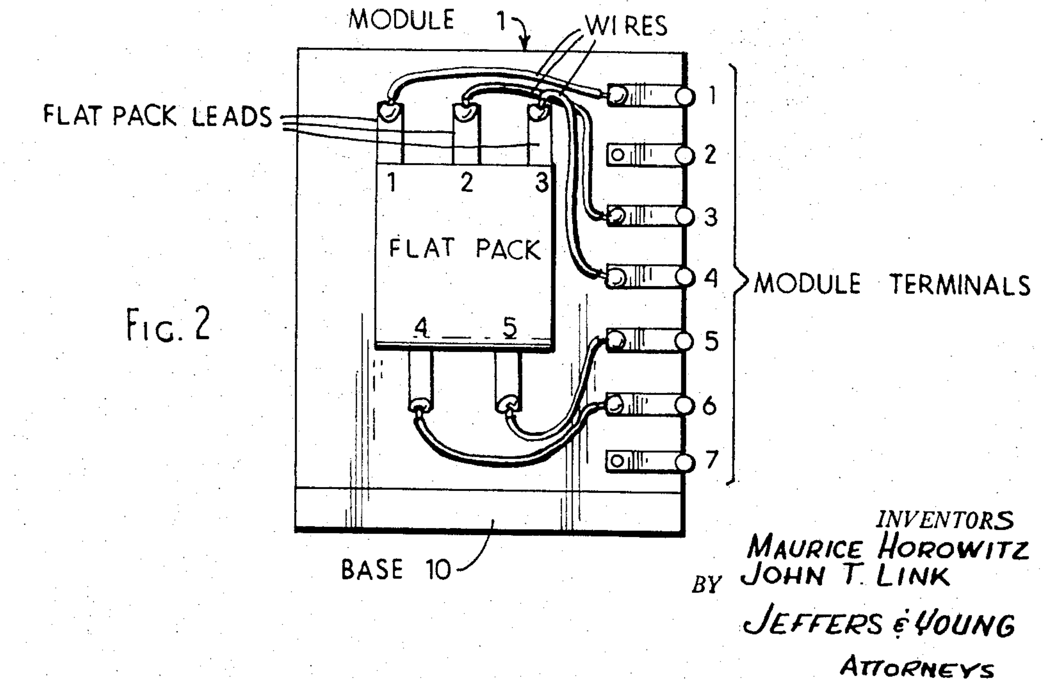
FIGURE 2 shows an enlarged plan view of one of the modules of FIGURE 1.
Figure 3A:
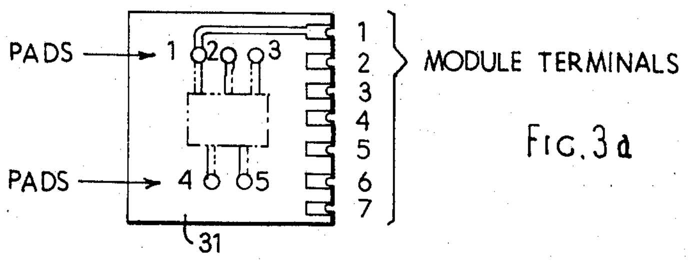
Figure 3B:
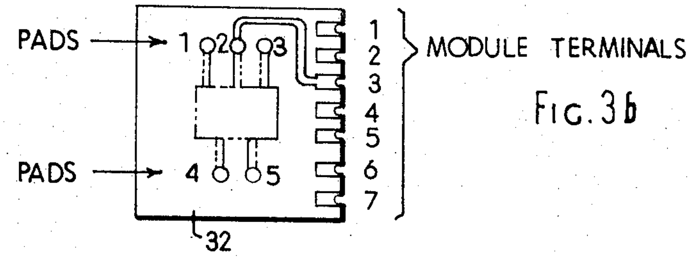
Figure 3C:
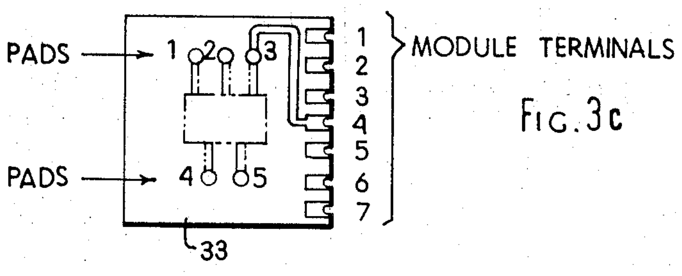
Figure 3D:
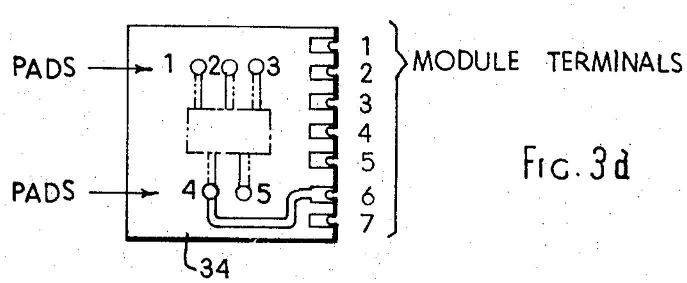
Figure 3E:
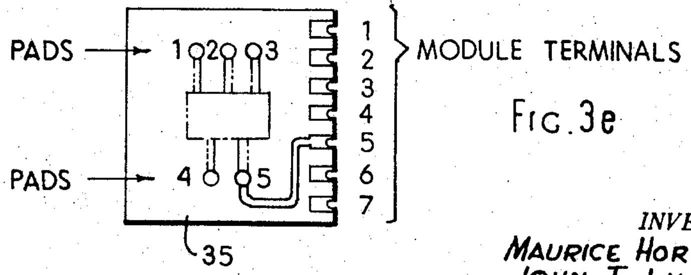

FIGURE 1 shows an assembly of modules each having an integrated circuit or flat pack with its leads connected by wires to module terminals in accordance with the one embodiment of our invention. In the assembly of FIGURE 1 it has been assumed that seven modules are to be assembled or wired together. It has also been assumed that each of these seven modules requires seven module terminals 1 through 7. It has also been assumed that each module carries an integrated circuit or flat pack having five terminals with three terminals on one side and with two terminals on the other side as shown and indicated. Each of the modules comprises a suitable sheet of insulating material such as a glass material bonded together with a suitable plastic. This material preferably, but not necessarily, has a square or rectangular shape, and has one or more edges provided with adjacent module terminals. It is preferred that each of the modules be formed of similar or identical sheets of insulating material, and that the module terminals on each of the sheets be correspondingly positioned so that when they are assembled or mounted on a base 10, the respective module terminals of each of the modules will be aligned. The module terminals may be placed on one or both main surfaces of the sheets of insulating material by any suitable means, such as printed circuit techniques which provide a deposit of copper or other conductive material having the configuration shown. The terminals may also extend around on the adjacent edge. The edge at which the module terminals are provided is preferably notched out in a semi-circular fashion for each terminal so as to facilitate placing interconnecting wires in these terminals and soldering or connecting the wires to the module terminals. A flat pack or integrated circuit is respectively mounted on each of the modules and may be fastened by any suitable means such as an adhesive or cement. Each flat pack lead is connected to a respective module terminal by a suitable wire, preferably insulated between its points of connection so as to eliminate or reduce the possibility of a short circuit. FIGURE 2 shows an enlarged plan view of module 1 (in FIGURE 1) with its flat pack and connections. The flat pack lead 1 is connected to module terminal 1 by a suitable wire connected between the flat pack lead and the module terminal. The wire may be connected by any suitable means, such as soldering or welding. Likewise, the flat pack lead 2 is connected to the module terminal 3, the flat pack lead 3 is connected to the module terminal 4, the flat pack lead 4 is connected to the module terminal 6, and the flat pack lead 5 is connected to the module terminal 5. Thus, the flat pack leads 1 through 5 are brought out at appropriate ones of the module terminals 1 through 7, depending upon the predetermined interconnection for the module 1 and the other modules 2 through 7.

Modules 2 through 7 shown in FIGURE 1 are likewise provided with respective flat packs, and the flat pack leads are connected to the respective module terminals in accordance with a predetermined interconnection plan. It is to be understood that there may be any preplanned or predetermined interconnection of a flat pack with its respective module terminals, and these connections may be the same as or different from the connections shown for flat pack 1 and module 1 in FIGURE 2. After each flat pack is mounted on its respective module and the flat pack leads connected to the module terminals, the modules are then assembled or mounted on the base 10. FIGURE 1 shows that it is preferable that the modules have the same square or rectangular configuration and that it is desirable that the module terminals be aligned at least along the edges having the terminals. That is, it is preferable that the edges with the terminals lie in a common plane. The modules, as shown in FIGURE 1, may be mounted close together on the base 10 to provide a good utilization of space or a high packing density. After the modules 1 through 7 are mounted on the base 10, they may then be interconnected. These interconnections are provided by suitable wire or buses which, if the predetermined arrangement has been properly planned, may be uninsulated wire that is laid along or in the module notches, and soldered to the terminals. As shown by the example of FIGURE 1, each module terminal 1 is connected to terminal 1 of all the other modules. Hence the bus or interconnecting wire extends along each terminal 1 of each module 1 through 7 and is soldered or connected thereto. Terminal 2 of modules 3 through 7 are interconnected. Terminal 3 of modules 1 through 3 are interconnected, and terminal 3 of modules 6 and 7 are interconnected. Terminal 4 of modules 1 through 5 are interconnected, and terminal 4 of modules 6 and 7 are interconnected. Terminal 5 of modules 1 through 5 are interconnected. Terminal 6 of modules 1 and 2 are interconnected, and terminal 6 of modules 4 and 5 are interconnected. And terminal 7 of modules 6 and 7 are interconnected. It should be noted that the wires laid in the various terminals may not be connected to a flat pack lead at all terminals. For example, there may be no flat pack lead connected to terminal 5 of module 4.

It will thus be seen that the assembly of modules having the same configuration and aligned module terminals facilitates interconnecting a large number of modules. The example of FIGURE 1 has assumed only 7 modules and that only seven module terminals were needed to provide all of the interconnections for these modules. However, the arrangement of FIGURE 1 may include any number of modules, and it may be necessary that additional module terminals be provided in order that all interconnections can be provided without wires or interconnections crossing. It is to be understood that the number of modules and the number of module terminals may not, and probably will not, be the same. The number of required module terminals for an assembly of modules depends upon the interconnection required between the modules. For mass production, it may be preferred that each module be provided with the greatest required number of module terminals to be expected, so that interconnections for any number of modules may be made with all modules being of the same configuration and having the same number of terminals. It will also be seen that the connections and arrangement shown in FIGURES 1 and 2 lend themselves readily to modern computer analysis and techniques because the connections are all aligned and may be reduced to the proper form for such an analysis. The arrangement shown in FIGURES 1 and 2 provides good utilization of space or a high packaging density. The arrangement of FIGURES 1 and 2 also permits the densely positioned boards on modules and flat packs to be easily and efficiently cooled, for example by forced air blown between the modules.

While the assembly described and explained in connection with FIGURES 1 and 2 provides good utilization of space and a high packaging density, the assembly requires hand techniques. That is, the interconnections between each of the flat pack leads and its appropriate module terminal is hand wired. Where mass production techniques are desirable, printed circuit connections to replace these hand wired connections are desirable and more efficient. But previously, it has been necessary to provide a separate printed circuit board for each possible combination of connections between the flat pack leads and the module terminals. If there are five flat pack leads and seven module terminals, then approximately 5 raised to the 7th power or 78,125 printed circuit boards would be required to provide all possible combinations of connections. Such a large number of printed circuit boards would be undesirable and, in most cases, impractical. If the number of flat pack leads is greater, and if the number of module terminals is greater, then the number of possible combinations increases greatly. The number of possible combinations is M raised to the Nth power, where M is the number of flat pack leads and N is the number of module terminals. In this relation, M and N may be any integers. A separate printed circuit board for each combination is impractical. However, the desirable mass production features of printed circuit boards can be utilized in accordance with our invention with only a relatively small number of printed circuit boards to provide a relatively large number of combinations. This is achieved in accordance with our invention by providing layers which are assembled to form modules. One layer is provided for connecting each flat pack lead to a respective module terminal. Thus, if there are five flat pack leads and seven module terminals, our invention requires only 5 times 7 or 35 layers. From these 35 layers, any of the 78,125 possible combinations can be provided by five selected layers assembled to form a module. Our invention will be explained for the assumed example of a flat pack having five leads which may be connected to any one of seven module terminals. An assembly of layers which achieve this result in accordance with our invention is shown in FIGURES 3*a* through 3*e*, 4, 5, and 6. The flat pack location and outline is shown in phantom on each layer.

In these figures, the layer assembly for one module is shown. This module corresponds to module 1 shown in FIGURES 1 and 2 which connects flat pack lead 1 to module terminal 1, flat pack lead 2 to module terminal 3, flat pack lead 3 to module terminal 4, flat pack lead 4 to module terminal 6, and flat pack lead 5 to module terminal 5. For these connections, the five appropriate layers 31 through 35 shown in FIGURES 3*a* through 3*e* would be selected from thirty-five possible layer. All of the thirty-five layers would have deposited thereon by printed circuit techniques flat pack pads 1, 2, 3, 4, and 5 similarly positioned and arranged to permit connection of the flat pack leads to the printed circuit flat pack terminals. Also, all of the thirty-five layers would have the module terminals 1 through 7 deposited thereon at a corresponding location and edge of the layer, and these module terminals would have a notch or semicircular cut or groove along the edge for receiving the interconnecting leads. And each of the thirty-five layers would have a printed circuit connection from one flat pack pad to one module terminal so that each flat pack pad is connected to each module terminal by a different layer. In the five selected layers, the layer 31 in FIGURE 3*a* has a printed circuit connection between the flat pack pad 1 and module terminal 1 as shown. The layer 32 has a printed circuit connection between the flat pack pad 2 and the module terminal 3. The layer 33 has a printed circuit connection between the flat pack pad 3 and the module terminal 4. The layer 34 has a printed circuit connection between the flat pack pad 4 and the module terminal 6. And the layer 35 has a printed circuit connection between the flat pack pad 5 and the module terminal 5. Again, it is to be noted that these five layers 31 through 35 were selected from a total number of 35 layers, the selection being made to provide the appropriate connections between predetermined flat pack leads and module terminals. After the layers 31 through 35 are selected, they are then stacked on top of each other in any order but with the module terminals aligned and with the flat pack pads aligned. The stack of layers 31 through 35 may be cemented or bonded together to form a module 40 as shown in FIGURES 4 and 5. With the layers 31 through 35 so stacked, the flat pack pads on each of the layers are aligned, and the module terminals on each of the layers are also aligned. In FIGURE 4, the printed circuit connection between the flat pack pad 1 and the module terminal 1 is visible since that particular layer 31 was stacked on top. However, beneath this layer are the other layers with their printed circuit connections between the other flat pack pads and the module terminals.

With the layers 31 through 35 so stacked and cemented together, holes are then drilled through the stacked layers at each of the flat pack pads 1 through 5 and at each of the module terminals 1 through 7. A flat pack 40 is mounted on the assembled layers or module 36, and its leads 41 through 45 are extended out to engage the flat pack pads 1 through 5 respectively. Then, the module 36 may have the holes filled with solder or other conducting material so as to interconnect each of the respectively located flat pack pads on each of the layers 31 through 35 and each of the respectively located module terminals 1 through 7 on each of the layers 31 through 35. At the same time when solder is applied, the flat pack leads 41 through 45 may be soldered or connected to the flat pack pads 1 through 5. The holes through each of the flat pack pads and each of the module terminals are desired to provide better interconnections in accordance with present printed circuit techniques.

FIGURE 6 shows a cross sectional view taken along the line 6—6 of FIGURE 4. FIGURE 6 is enlarged in its vertical dimension to show the cross section of metallic and insulated portions. In FIGURE 6, flat pack pads 1 through 3 are indicated for the top layer 31, but corresponding pads 1 through 3 are also shown beneath these for the other layers 32 through 35. The holes drilled through these pads 1 through 3 are shown filled with a conducting material such as solder 51, 52, 53. Likewise, the hole drilled through module terminal 1 of all layers 31 through 35 is filled with conducting material or solder 54. This conducting material or solder provides better connections since it increases the contact between each of the aligned flat pack pads, and each of the aligned module terminals. Thus, the module 36 shown in FIGURES 4, 5, and 6 provides a printed circuit connection between flat pack pads 1 through 5 and module terminals 1, 3, 4, 6, and 5 respectively. And any possible combination can be provided with 35 different layers which are constructed as printed circuits, and which can be easily assembled and interconnected by mass production techniques. Thus, the module 36 shown and described in connection with FIGURES 3*a* through 3*e*, 4, 5, and 6 may be assembled and interconnected with other modules as described in connection with FIGURES 1 and 2. The modules provided from the layers may be positioned and interconnected by computer analysis and techniques, and may be easily and efficiently cooled.

It will thus be seen that our invention provides an improved module construction which permits efficient interconnection and utilization of space for a plurality of modules carrying flat packs or integrated circuits. Our invention also provides printed circuit layers which may be assembled into a module to provide a relatively large number of possible combinations from a relatively small number of layers. These layers may be assembled and connected with mass production techniques. Finally, the modules having the module terminals aligned along one edge lend themselves readily to computer techniques for determining the interconnections and arrangements of the modules, and lend themselves readily to being easily interconnected by simply laying interconnecting leads or buses in the module terminals and soldering them to the terminals.

Therefore, while our invention has been described with reference to particular embodiments, it is to be understood that modifications may be made without departing from the spirit of the invention or from the scope of the claims.

What we claim as new and desire to sceure by Letters Patent of the United States is:

1. A module for receiving an integrated circuit having M leads, where M is any integer, to be connected to at least one other intgerated circuit, comprising:

(a) M layers each comprising a sheet of insulating material having conducting material thereon in a configuration of a plurality of integrated circuit pads and a plurality of edge terminals, corresponding integrated circuit pads on each of said layers being correspondingly positioned and corresponding edge terminals on each of said layers being correspondingly positioned, said sheets further having conducting material thereon in a respective configuration for connecting a predetermined one of said integrated circuit pads to a predetermined one of said edge terminals;

(b) means fastening M predetermined layers together with said integrated circuit pads respectively aligned and connected and with said edge terminals respectively aligned and connected;

(c) means mounting the integrated circuit on said fastened layers;

(d) and means connecting each of said M integrated circuit leads to a respective one of said layer integrated circuit pads, and thereby connecting said integrated circuit leads to said edge terminals.

2. A module for receiving an integrated circuit to be connected to other modules with respective integrated circuits, comprising:

(a) a plurality of layers of insulating sheets all having substantially the same configuration, all having a plurality of integrated circuit connection pads placed thereon in the same configuration and arrangement, all having a plurality of notches in the same configuration and arrangement along a corresponding edge thereof, all having a plurality of notch terminals placed thereon in the same configuration and arrangement in the vicinity of said notches, and each having a connection placed thereon between a predetermined one of said integrated circuit connection pads and a predetermined one of said notch terminals respectively.

(b) means fastening said plurality of layers together in a stack with said integrated circuit connection pads respectively aligned and with said notches and notch terminals respectively aligned;

(c) means connecting each of said respectively aligned integrated circuit connection pads;

(d) and means connecting each of said respectively aligned notch terminals.

3. An assembly of a plurality of modules, each as defined in claim 2, said assembly comprising a base, means mounting said modules on said base with said notch terminals respectively aligned, and wire buses positioned in predetermined ones of said notches and connected to said predetermined notch terminals.

4. The modules of claim 2 wherein each of said integrated circuit connection pads, each of said notch terminals, and each of said connections placed on said layers are films of printed circuit conducting material.

5. An arrangement for interconnecting a plurality of flat packs each having a predetermined number of flat pack leads to be connected to other flat pack leads, comprising a module board having a flat pack mounted thereon, said flat pack having M leads, where M is any integer, said module board comprising:

(a) M layers of insulating material;

(b) each of said layers having M pads of conductive material fastened thereto and identically arranged to permit said flat pack leads to be respectively connected thereto;

(c) each of said layers having a plurality of edge terminals of conducting material fastened thereto and arranged adjacent an edge of said layer to permit interconnecting said modules;

(d) each of said layers having a strip of conductive material fastened thereto and extending between and respectively connecting one of said M layer pads to one of said edge terminals only;

(e) means passing through said M layers for electrically connecting corresponding ones of said M layer pads;

(f) and means for connecting each of said flat pack leads to a respective one of said M layer pads.

6. The arrangement of claim 5 wherein said module board further comprises means passing through said M layers for electrically connecting corresponding ones of said edge terminals.

7. The arrangement of claim 5 wherein said module board is notched along said edge for permitting interconnecting buses to be placed therein for connection to said edge terminals.

8. The arrangement of claim 5 wherein said M layer pads of conductive material, said plurality of edge terminals, and said strips of conductive material are printed electrical circuits.

References Cited

UNITED STATES PATENTS

| | | | |
|---|---|---|---|
| 2,774,014 | 12/1956 | Henry. | |
| 2,907,924 | 10/1959 | Lutton. | |
| 2,978,612 | 4/1961 | Lutton. | |
| 3,004,230 | 10/1961 | Levinsohn. | |
| 3,047,749 | 7/1962 | Fisher | 310—9.4 |
| 3,311,791 | 3/1967 | Larson et al. | 317—101 |

LEWIS H. MYERS, *Primary Examiner.*

J. R. SCOTT, *Assistant Examiner.*